(12) United States Patent
Liu

(10) Patent No.: US 6,362,454 B1
(45) Date of Patent: Mar. 26, 2002

(54) METHOD FOR DRILLING CIRCULAR HOLES WITH A LASER BEAM

(75) Inventor: Xinbing Liu, Acton, MA (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/411,195

(22) Filed: Oct. 1, 1999

(51) Int. Cl.[7] .............................................. B23K 26/00
(52) U.S. Cl. ............................ 219/121.7; 219/121.71; 219/121.73; 219/121.78
(58) Field of Search ....................... 219/121.7, 121.71, 219/121.73, 121.78, 121.79, 121.65, 121.66, 121.68, 121.69

(56) References Cited

U.S. PATENT DOCUMENTS

| 3,576,965 A | * | 5/1971 | Gugger ........................ 219/121 |
| 4,822,974 A | | 4/1989 | Leighton |
| 5,043,553 A | * | 8/1991 | Corfe et al. ............. 219/121.7 |
| 5,744,780 A | | 4/1998 | Chang et al. |
| 5,837,964 A | | 11/1998 | Emer et al. |

* cited by examiner

Primary Examiner—M. Alexandra Elve
(74) Attorney, Agent, or Firm—Ratner & Prestia

(57) ABSTRACT

A method and apparatus for machining a work piece with a laser beam to form a circular hole in the work piece applies the laser beam to a beam rotator which rotates the laser beam about an axis of rotation before it is applied to the work piece. In one embodiment, a laser generates a laser beam having a beam area and a beam axis within the beam area. A beam rotator rotates the laser beam about the beam axis and directs the rotating laser beam to the work piece. One beam rotator employs three reflective surfaces which invert the beam across only one axis defined in the beam cross-section. Another beam rotator employs a triangular prism which receives the laser beam at a first surface at an angle of incidence equal to the Brewster's angle for the prism, totally internally reflects the laser beam from a second surface to direct the light out of the prism through a third surface. This beam rotator also employs a rotating half wave plate to ensure that the light entering the prism is p-polarized. The rotating laser beam produced by the beam rotator may be focussed into a single focussed rotating beam or diffracted to form multiple rotating laser beams.

27 Claims, 7 Drawing Sheets

METHOD FOR DRILLING CIRCULAR HOLES WITH A LASER BEAM

FIELD OF THE INVENTION

This invention relates to forming holes with a laser beam and, in particular, to drilling circular holes with noncircular or irregular laser beams.

BACKGROUND OF THE INVENTION

Lasers may be used to drill holes in or otherwise machine a work piece. For example, a laser may be used to machine metal foils to produce print heads for inkjet printers. Lasers may also be used to machine dielectric materials to form wave guides or microoptical structures in the materials.

For some laser drilling applications, such as laser drilling of inkjet nozzles, it is preferable for the drilled holes to be circular. The shape of a hole formed by a focused laser may depend on the shape of the laser beam. Irregularities in the shape of the laser beam and its intensity distribution may result in a non-circular hole being drilled.

Existing methods for drilling roughly circular holes using laser beams may employ a technique known as trepan drilling. In trepan drilling a laser beam is translated in a circular pattern on the work piece. While trepan drilling reduces the effects of localized irregularities in the intensity distribution of the drilling laser, it can not correct for all beam irregularities, especially for irregularities occurring near the edge of the beam cross-section. If, for example, the beam cross-section is elliptical then any hole drilled by trepan drilling, in which the beam is translated in a circular pattern, will also be elliptical. This is especially true for very small holes. Indeed, because trepan drilling moves the beam along a circular course to drill the circular hole, it is difficult to make a small hole. It would be impossible, for example, to make a hole by trepan drilling that has the same size as the active area of the laser beam cross-section.

Another technique that is used for drilling circular holes is to use the laser to project an image of a circular aperture on to the work piece. This method may, for example, use a circular mask to block portions of the beam which are outside of the mask. This technique is undesirable, however, as the energy in the masked area is not applied to the work piece.

SUMMARY OF THE INVENTION

The present invention is embodied in a method and apparatus for machining a work piece with a laser beam to form a circular hole in the work piece.

According to an aspect of the present invention, a laser generates a laser beam having a beam area and a beam axis within the beam area. A beam rotator rotates the laser beam about the beam axis and directs the rotating laser beam toward the work piece.

According to another aspect of the present invention, the beam rotator rotates at an angular velocity and causes the laser beam to rotate at twice that angular velocity.

According to another aspect of the present invention, the laser beam is a pulsed laser beam and multiple pulses are applied to the work piece to drill a single hole.

It is to be understood that both the foregoing general description and the following detailed description are exemplary, but are not restrictive, of the invention.

BRIEF DESCRIPTION OF THE DRAWING

The invention is best understood from the following detailed description when read in conjunction with the accompanying drawing. It is emphasized that, according to common practice, the various features of the drawing are not to scale. On the contrary, the dimensions of the various features are arbitrarily expanded or reduced for clarity. Included in the drawing are the following figures.

DETAILED DESCRIPTION OF THE INVENTION

Figure 1:
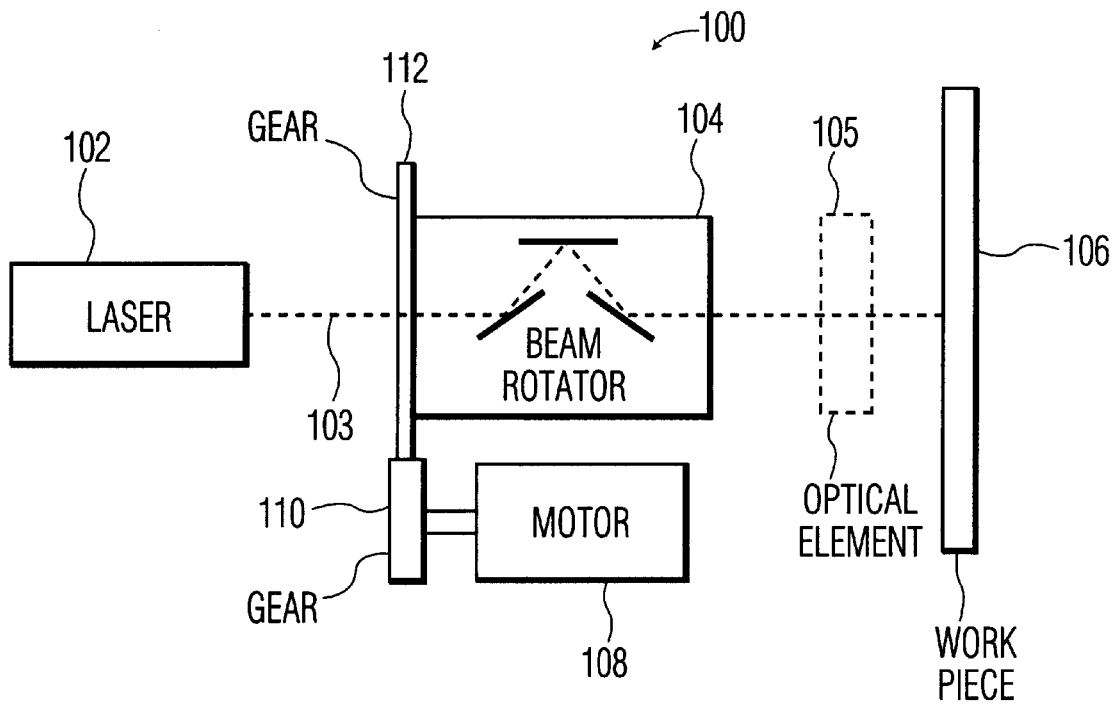
FIG. 1 is a functional block diagram of an apparatus for forming holes using a laser according to an exemplary embodiment of the present invention.

Referring now to the drawing, in which like reference numerals refer to like elements throughout, FIG. 1 shows an apparatus 100 for forming circular holes using a laser according to an exemplary embodiment of the present invention.

The apparatus 100 includes a laser 102 which generates a laser beam 103. The beam 103 is passed through a beam rotator 104 and directed on to a work piece 106 through an optional optical device 105 (shown in phantom) such as a lens or a diffractive element. In the exemplary embodiment of the invention, the laser 102 may be either a continuous or pulsed laser having sufficient power to form a hole in the work piece. As set for the below, if a pulsed laser is used, it is desirable for a sufficient number of pulses to be applied to cover at least a 180 degree rotation of the beam rotator. If an ultra short pulse laser beam is used, for example, one to two hundred pulses may be used to drill the hole, applied during several rotations of the beam rotator 104.

The beam rotator 104 is coupled to a motor 108 by gears 110 and 112. The motor rotates the beam rotator 104 around an axis defined by the laser beam 103. As described below, the beam rotator 104 rotates the beam about this axis to rotate the laser beam 103 about this axis. It is important to note that the laser beam is rotated about the axis; it is not simply translated as in the trepan drilling devices. To obtain small circular holes, it is desirable for the axis of rotation of the beam rotator 104 to coincide with the center of the laser beam 103. If, however, the axis of rotation does not coincide with the center of the beam 103, the rotator 104 rotates the laser beam about this axis. Because the beam rotates, any irregularities in the intensity of the beam are applied to the work piece 106 in a tight circular pattern, ensuring that the laser beam 103 drills a circular hole in the work piece 106. By contrast, trepan drilling can not apply the different intensities in the laser as uniformly because it does not rotate the beam.

When a pulsed laser is used, it is desirable for the beam rotator to rotate between pulses of the laser beam. Because the average intensity of the beam is not affected by the rotation, the beam rotator 104 may rotate the laser beam 103 while a laser pulse is being emitted. To ensure that the advantages of the invention are applied when pulsed lasers are used, it is desirable to control the rotation of the beam to ensure that multiple pulses are applied at respectively different rotational positions and to ensure that the laser beam is rotated by at least 360 degrees in the time required to drill the hole. This may be accomplished very simply by controlling the speed of rotation of the beam rotator 104 such that the time for a 180 degree rotation of the rotator is less than the time required to drill the hole but not an even multiple of the time between pulses of the laser. Alternatively, the motor 108 may be a stepper motor and may be controlled by apparatus (not shown) which advances the stepper motor by a predetermined number of steps between each laser pulse. The number of steps should be sufficient to ensure that the laser beam is fully rotated at least once for the number of pulses used to drill the hole.

The optional optical element 105 is placed between the beam rotator 104 and the work piece 106. This optical element does not affect the rotation of the beam but may focus the rotating beam, if a lens is used for the element 105, or may split the rotating beam into multiple beams, if a diffractive element is used for the element 105. These are exemplary elements. It is contemplated that other types of optical elements may be inserted between the beam rotator 104 and the work piece 106 to condition the rotating beam before it is applied to the work piece 106.

Figure 2:
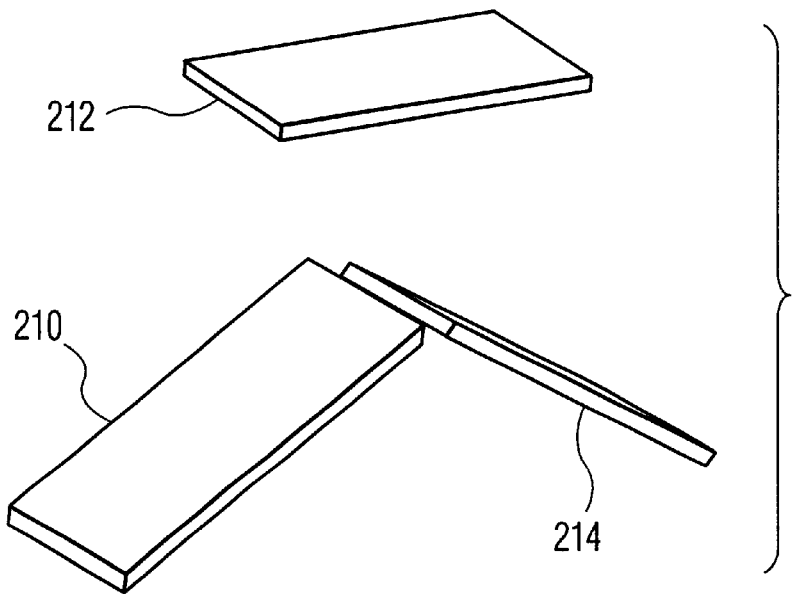
FIG. 2 is a perspective drawing of elements of a beam rotator suitable for use in the apparatus shown in FIG. 1.

FIG. 2 is a perspective drawing of three mirror elements which form the beam rotator 104. The mirror elements are shown without their mounting structures to simplify the explanation of the invention. It is contemplated that the mirror elements 210, 212 and 214 may be, for example, front-silvered mirrors which are mounted in the beam rotator 104 using any method which secures the mirrors in fixed positions within the rotator 104. This includes gluing or otherwise securing discrete mirrors to machined surfaces in the rotator 104, forming mirror elements directly on machined and polished surfaces of the rotator 104 or other suitable methods.

Figure 3:
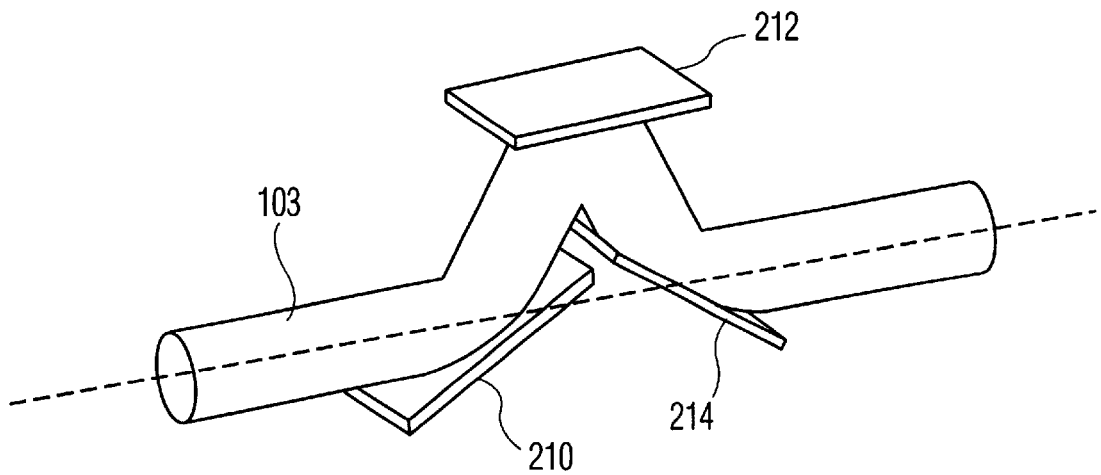
FIG. 3 is a perspective drawing of the elements shown in FIG. 2 including a diagram of a laser beam being directed through the beam rotator.

The mirrors 210, 212 and 214 are arranged to reflect a beam incident upon mirror 210 onto mirror 212 and then onto mirror 214. As shown in FIG. 3, the mirrors 210, 212 and 214 are configured such that the output beam reflected from mirror 214 has essentially the same trajectory as the input beam which is incident on mirror 210. Ideally, this trajectory is coincident with the rotational axis 310 of the beam rotator. As described above, however, if the trajectory of the beam 103 is displaced from the rotational axis, the beam 103 is still rotated about the axis 310 and still machines the work piece 106 in a circular pattern. If the trajectory of the beam is not parallel to the rotational axis 310 of the beam rotator, the beam transmitted by the rotator defines a conical volume. This may be useful to move the rotating beam along a circular course to perform trepan-like drilling, or to drill conical features into the work piece, in conjunction with a focusing lens.

Figure 4:
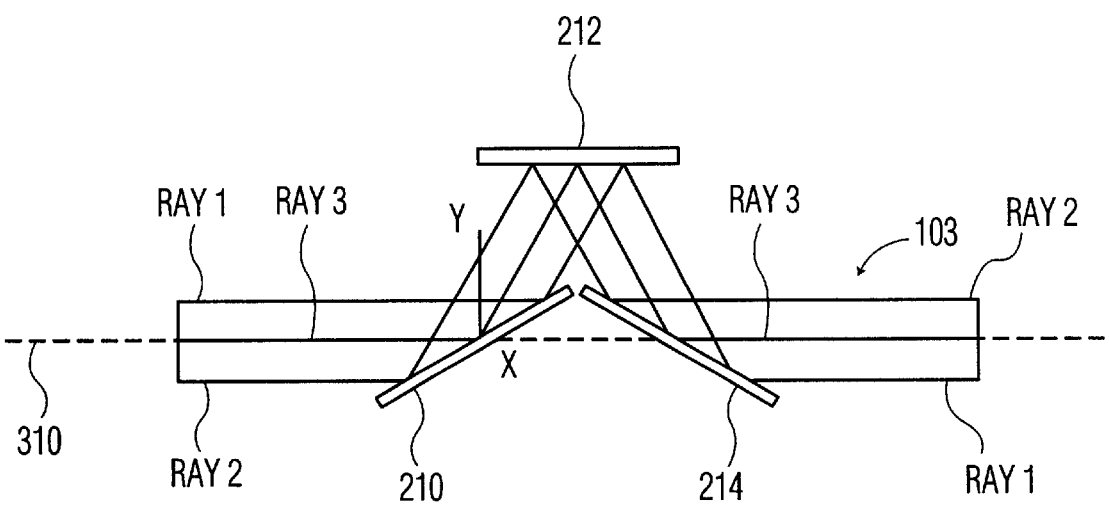
FIG. 4 is a side plan view of the elements shown in FIGS. 2 and 3 in which the laser beam is illustrated by ray traces.

The beam rotator 104 operates to rotate the beam about the axis 310 because the mirrors 210, 212 and 214 reverse the beam along one axis of the beam cross-section but not along the other. FIG. 4 is a side plan view of the mirrors 210, 212 and 214 which illustrates this feature of the beam rotator 104. In FIG. 4, X and Y axes are shown for the cross-section of beam 103. The X-axis is parallel to the surface of the mirror 210 and comes out of the page. The Y-axis is perpendicular to the X axis. As can be seen from FIG. 4, a ray, RAY 1 (RAY 2), in the input beam that is above (below) the X-axis emerges symmetrically from the device below (above) the X-axis in the output beam. In other words, the X-axis is the line of symmetry. On the other hand, a ray on the left or right of the Y-axis remains on the left or right side of the Y-axis as it propagates through the device. A ray, RAY 3, which coincides with the axis of rotation 310 of the device emerges from the device on the axis of rotation.

FIGS. 5A through 5G are front-plan views of the beam rotator mirrors 210 and 212 of the present invention including the X and Y axes of FIG. 4 and showing the cross-section of the laser beam 103. These Figures show the beam rotator in several angular positions to illustrate how the mirror configuration shown in FIGS. 2 through 4 may be used to rotate the beam 103. FIGS. 5A through 5G show an incident ray, IR, applied at the 3 o'clock position on the beam cross-section and positions for the corresponding output ray, OR, for various rotations of the beam rotator 104.

Figure 5A:
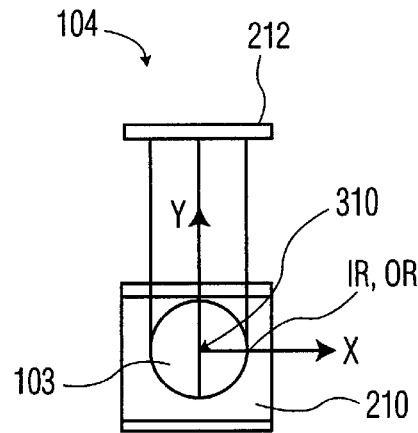
FIGS. 5A through 5G are front plan views of the beam rotator elements shown in FIGS. 2 through 4 which are useful for describing how the elements are used to rotate the laser beams.
Figure 5B:
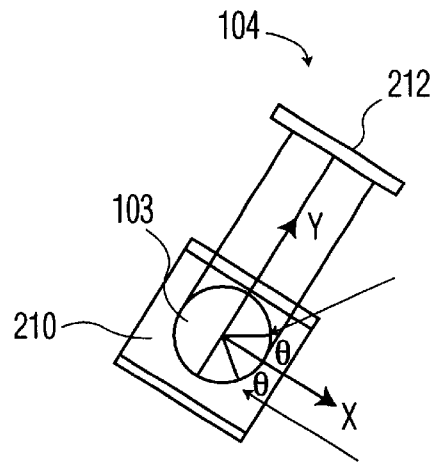
Figure 5C:
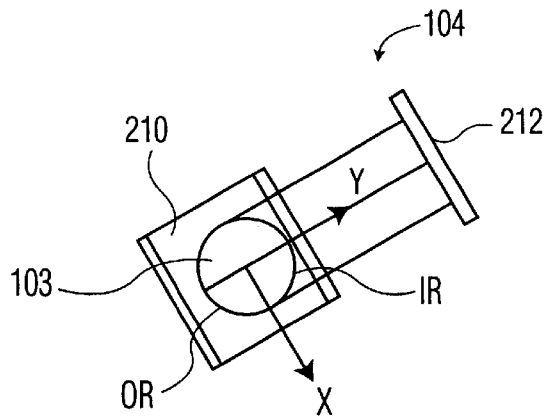
Figure 5D:
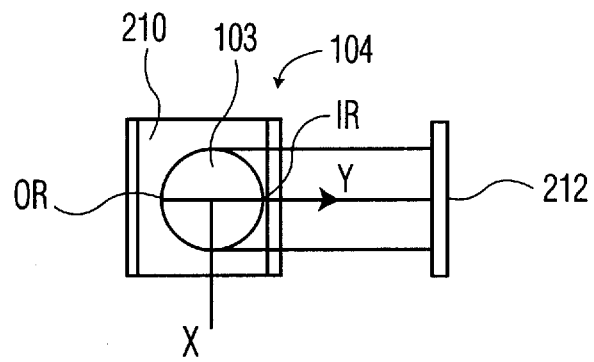
Figure 5E:
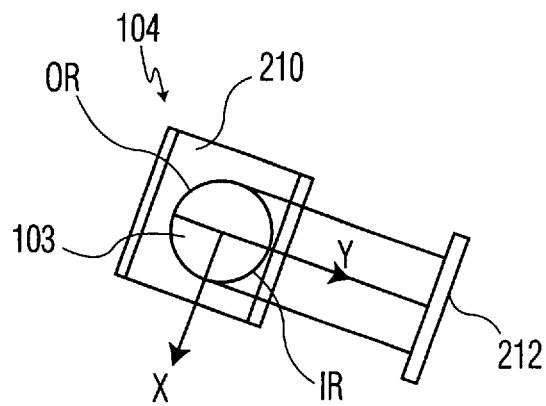
Figure 5F:
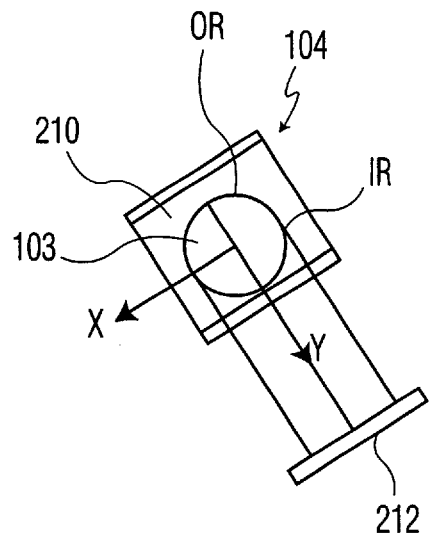
Figure 5G:
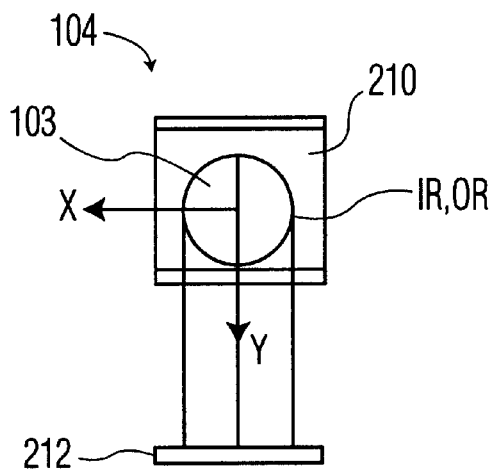

In FIG. 5A, the beam rotator is in the starting position and the ray IR is on the X-axis (i.e. at the 3 o'clock position on the beam cross-section). As described above, the Y-axis is not an axis of symmetry, accordingly, the output ray, OR, is also at the 3 o'clock position in the output beam cross-section. FIG. 5B shows the beam rotator 104 rotated by an angle θ of 30 degrees. As shown in FIG. 5B, this rotation results in the beam being rotated by 60 degrees. That is to say, the input ray, IR, incident at the 3 o'clock position of the beam, results in the ray output ray, OR, being at the 5 o'clock position in the output beam. In FIG. 5C, the beam rotator 104 is rotated by an angle of 60 degrees with respect to its position in FIG. 5A. As shown in FIG. 5C, the ray OR is at the 7 o'clock position, displaced from the ray IR by 120 degrees. FIGS. 5D, 5E, and 5F show the beam rotator rotated by 90, 120 and 150 degrees with respect to its position in FIG. 5A. These Figures also show the output ray, OR, rotated by 180, 240 and 300 degrees with respect to the input ray, IR. FIG. 5G shows the beam rotator rotated by 180 degrees with respect to its position in FIG. 5A and shows that the rays IR and OR once again coincide.

As shown in FIGS. 5A through 5G, a rotation of the beam rotator 104 by an angle ω causes the beam to rotate by an angle 2ω. Thus, a 180 degree rotation of the beam rotator 104 produces a 360 degree rotation of the laser beam 103 on the work piece 106.

Figure 6:
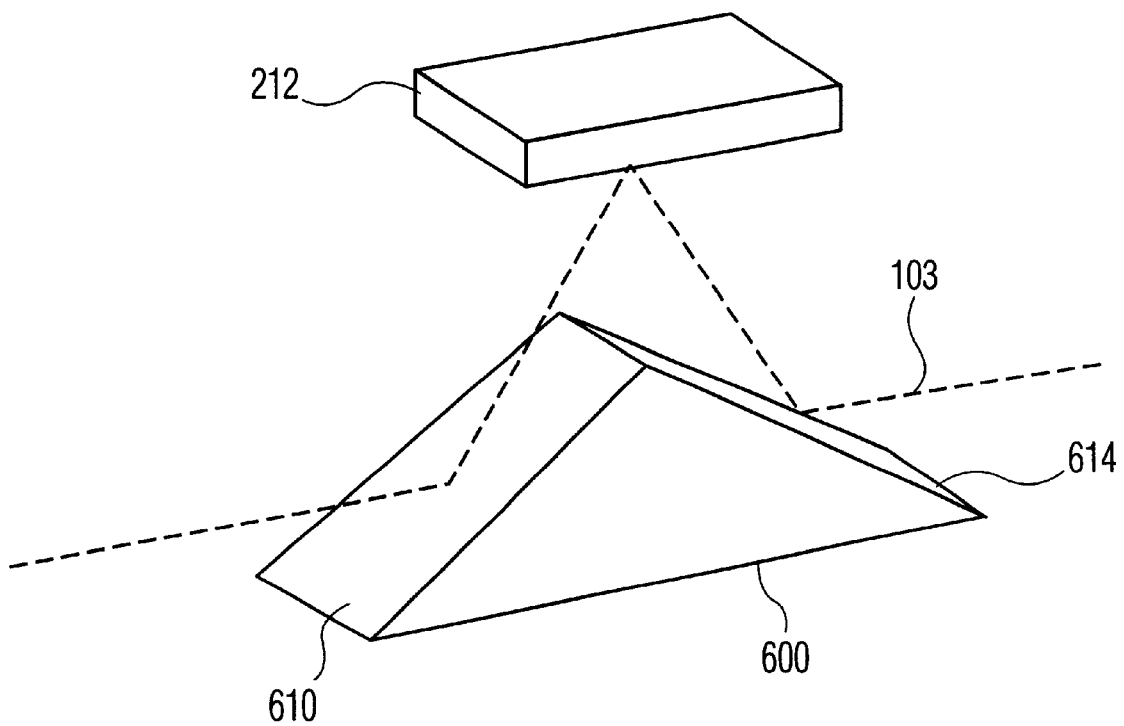
FIG. 6 is a perspective view of an alternative beam rotation device.

FIG. 6 illustrates a first alternative embodiment of the invention. In the apparatus shown in FIG. 6, the mirrors 210 and 214 are replaced by two faces 610 and 614 of a prism 600. The surfaces 610 and 614 are desirably coated to reflect the laser beam. In the apparatus shown in FIG. 6, the apex angle of the prism is 120 degrees and the incident angle of the laser beam on the prism surface is 60 degrees. It is contemplated, however, that with proper placement of the mirror 212, the angle of incidence of the laser on the prism may be any angle greater than 45 degrees. This alternative embodiment of the invention operates in the same way as the embodiments described above with reference to FIGS. 2 through 5G. An incident laser beam is reflected from prism face 610 to mirror 212 and then to prism face 614. This embodiment has the advantage of easier assembly and alignment than the embodiment shown in FIG. 2 as the relative positions of the reflecting surfaces 610 and 614 are fixed in the embodiment shown in FIG. 6.

Figure 7:
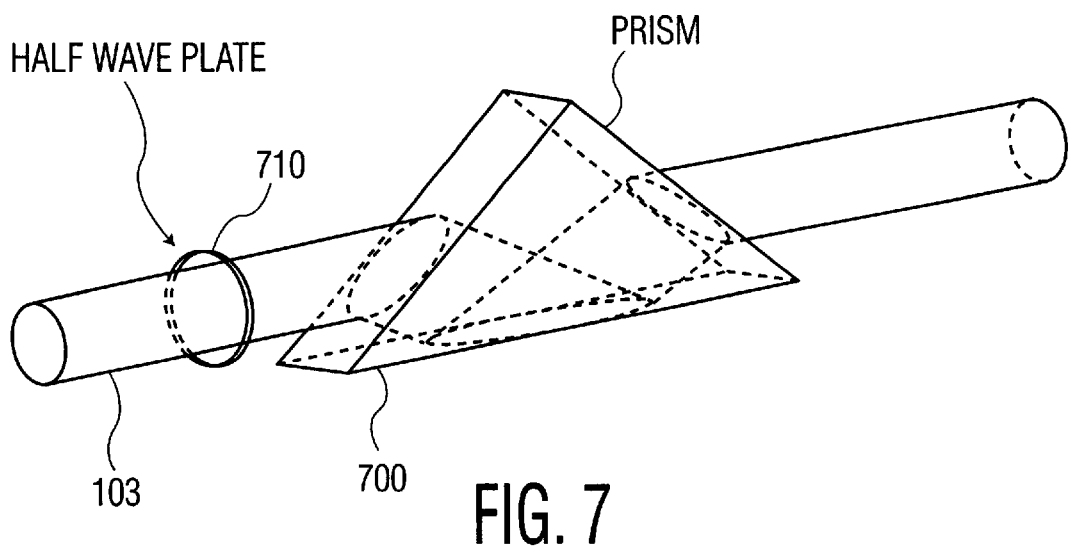
FIG. 7 is a perspective view of another alternative beam rotation device.

FIG. 7 shows a second alternative embodiment of the invention. In this embodiment, all of the reflecting surfaces 210, 212 and 214 of the embodiment shown in FIG. 2 are replaced by a single prism 700. In this embodiment of the invention, refraction by the prism rather than surface reflection is used to redirect the laser beam 103. Once inside the prism, the angle of the refracted beam with respect to the bottom surface of the prism 700 is greater than the critical angle and, thus, is reflected from the bottom surface by total internal reflection.

Figure 8:
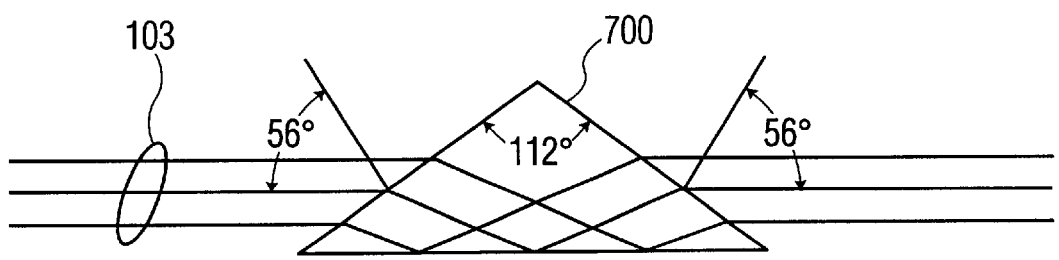
FIG. 8 is a side plan view of the beam rotation device shown in FIG. 7 with ray traces to illustrate the operation of the device.

As shown in FIG. 8, this embodiment of the invention uses a particular angle of incidence, the Brewster angle. The Brewster angle, $\phi$, is given by the formula $\phi=\tan^{-1}n$, where n is the index of refraction of the prism material relative to air. For ordinary glass, $n\approx1.5$ and $\phi\approx56$ degrees. When a linearly polarized incident laser beam has an electrical field in the plane of incidence (p-polarization), the reflectivity at the interface between the glass and the air is zero; all of the light is refracted into the prism. Thus, there is no loss of light when p-polarized light is used in the configuration shown in FIG. 7 even though the prism 700 is uncoated, because the light is incident at the Brewster angle and because it is reflected from the bottom surface of the prism by total internal reflection.

Figure 9:
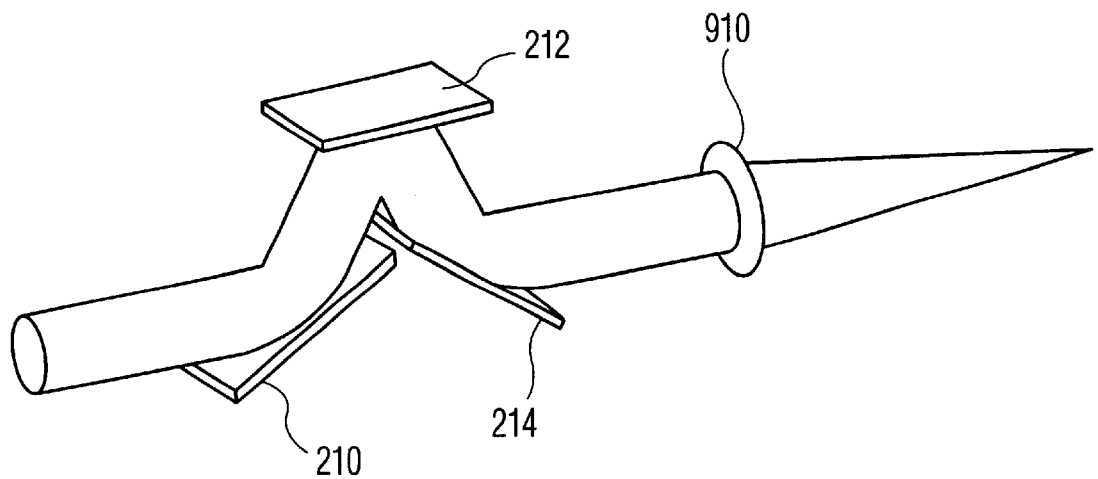
FIG. 9 is a perspective view of the beam rotator shown in FIG. 2 configured to provide the rotating beam to a focusing lens to produce a focused rotating laser beam.

To ensure that the incident light beam is p-polarized relative to the rotating prism, a rotating half wave plate may be placed in front of the prism. The half wave plate rotates at half the rotation speed of the prism. The half wave plate rotates the polarization of the laser beam at twice the speed of its rotation, accordingly, in this configuration, the rotation of the polarization of the laser beam 103 is the same as the rotation of the prism, The rotating laser beam produced by any of the apparatus described above may be used as a stationary laser beam would be used. FIG. 9 shows the apparatus of FIG. 2 followed by a focusing lens 910 in a configuration that may be used for laser drilling applications. The rotation of the beam does not affect the focus position.

Figure 10:
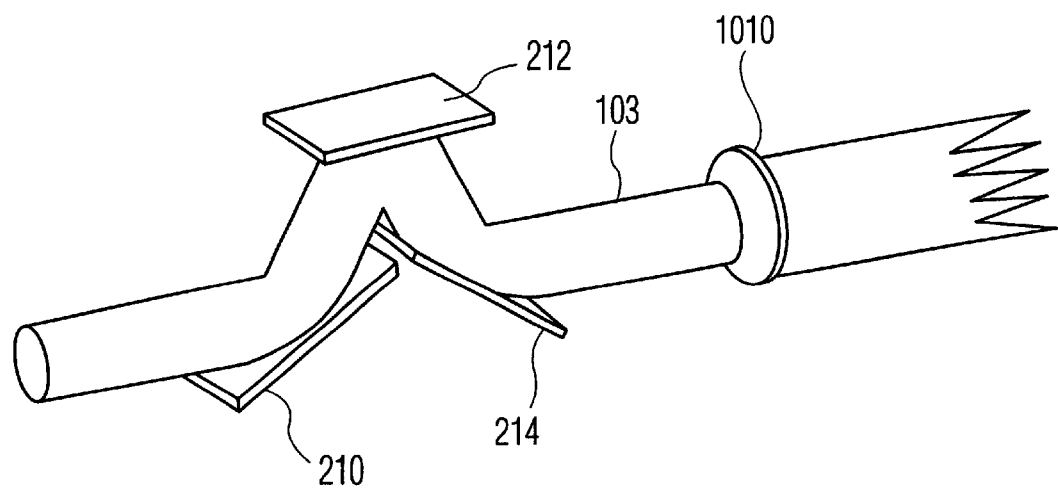
FIG. 10 is a perspective view of the beam rotator shown in FIG. 2 configured to provide the rotating beam to a diffractive element to produce multiple parallel rotating laser beams.

FIG. 10 is a perspective diagram which shows another application of the rotating laser beam. In this application, a stationary diffractive element 1010 is inserted between the beam rotator and the work piece. The rotating beam 103 is split into multiple rotating beams by the diffractive optical element 1010. This structure may be used, for example, to generate multiple rotating beams. Each of the beams rotates at twice the rotational speed of the beam rotator 104. This apparatus may be used to drill multiple round holes simultaneously, for example to produce an ink jet nozzle.

As set forth above, when the center of the laser beam is coincident with the rotational axis of the beam rotator 104, the laser beam applied to the work piece rotates about the center of the laser beam at a rotational rate that is twice the rotational rate of the beam rotator 104. If the center of the laser beam is offset from the rotational axis of the rotator 104 then the beam rotates around the rotational axis. This is similar to the trepan drilling methods except, that in the trepan methods, the center of the beam is moved in a circle but the beam does not rotate. In a trepan application of the present invention, however, the beam rotates as it is moved in a circle on the work piece.

The configuration described above are not the only contemplated beam rotator configurations. All of the illustrated configurations employed an odd number of reflecting surfaces. It is contemplated that other configurations having different odd numbers of reflecting surfaces (e.g. 5, 7, etc.) may be used to produce a similar result. One of ordinary skill in the art can readily configure the odd number of reflective surfaces to provide an output beam which is inverted across one axis but not across the perpendicular axis through reflection by the odd number of reflective surfaces. In addition, as set forth above, if the central element of the beam rotator is a prism, the first and last reflective surfaces may be replaced by refractive surfaces. The prism would then provide an odd number of reflective surfaces greater than or equal to one.

Although illustrated and described above with reference to certain specific embodiments, the present invention is nevertheless not intended to be limited to the details shown. Rather, various modifications may be made in the details within the scope and range of equivalents of the claims.

What is claimed is:

1. A method for drilling holes in a work piece with a laser comprising the steps of:

receiving a laser beam having a beam cross section with a predetermined angular orientation and directed along a beam axis located with the beam cross section;

rotating the laser beam about an axis of rotation, substantially parallel to the beam axis, and directing the rotating laser beam toward the work piece, wherein the angular orientation of the beam cross section changes as the beam is rotated.

2. A method according to claim 1, wherein the step of rotating the beam includes the step of reflecting the beam among an odd number of reflective surfaces, wherein the number of reflective surfaces is greater than or equal to three.

3. A method according to claim 1, wherein the step of rotating the beam includes the steps of refracting the beam at a first refractive surface;

reflecting the refracted beam successively from an odd number of reflective surfaces, the number of reflective surfaces being greater than or equal to one; and refracting the beam at a second refractive surface toward the work piece.

4. A method according to claim 1, wherein the step of rotating the beam includes the steps of:

reflecting the beam from a first surface to a second surface;

reflecting the beam from the second surface to a third surface;

reflecting the beam from the third surface to the work piece; and rotating the first, second and third surfaces about the axis of rotation.

5. A method according to claim 4, further including the step of focussing the rotating laser beam after it is reflected from the third surface to apply a focussed rotating laser beam to the work piece.

6. A method according to claim 4, further including the step of diffracting the rotating laser beam to form multiple rotating laser beams to apply the multiple rotating laser beams to the work piece.

7. A method according to claim 1, wherein the step of rotating the beam includes the steps of:

refracting the beam at a first surface to a second surface;

reflecting the beam from the second surface to a third surface;

refracting the beam at the third surface to the work piece; and rotating the first, second and third surfaces about the axis of rotation.

8. A method for drilling holes in a workpiece with a laser comprising the steps of, receiving a laser beam having a beam cross section with a predetermined angular orientation and directed along a beam axis located within the beam cross section;

rotating the laser beam about an axis of rotation, substantially parallel to the beam axis, and directing the rotating laser beam toward the workpiece, wherein the angular orientation of the beam cross section changes as the beam is rotated wherein the step of rotating the beam includes the step of reflecting the beam among an odd number of reflective surfaces, wherein the number of reflective surfaces is greater than or equal to three.

9. A method for drilling holes in a workpiece with a laser comprising the steps of:

receiving a laser beam having a beam cross section with a predetermined angular orientation and directed along a beam axis located within the beam cross section;

rotating the laser beam about an axis of rotation, substantially parallel to the beam axis, and directing the rotating laser beam toward the workpiece, wherein the angular orientation of the beam cross section changes as the beam is rotated, wherein the step of rotating the beam includes the steps of;

refracting the beam at a first refractive surface;

reflecting the refracted beam successively from an odd number of reflective surfaces, the number of reflective surfaces being greater than or equal to one; and refracting the beam at a second refractive surface toward the workpiece.

10. A method according to claim 8, wherein the step of rotating the beam includes the steps of:

reflecting the beam from a first surface to a second surface;

reflecting the beam from the second surface to a third surface;

reflecting the beam from the third surface to the workpiece; and rotating the first, second and third surfaces about the axis of rotation.

11. A method according to claim 10, further including the step of focussing the rotating laser beam after it is reflected from the third surface to apply a focussed rotating laser beam to the workpiece.

12. A method according to claim 10, further including the step of diffracting the rotating laser beam to form multiple rotating laser beams to apply the multiple rotating laser beams to the workpiece.

13. A method according to claim 9, wherein the step of rotating the beam includes the steps of:

refracting the beam at a first surface to a second surface;

reflecting the beam from the second surface to a third surface;

refracting the beam at the third surface to the workpiece; and rotating the first, second and third surfaces about the axis of rotation.

14. A method for drilling holes in a workpiece with a laser comprising the steps of:

receiving a laser beam having a beam cross section with a predetermined angular orientation and directed along a beam axis located within the beam cross section;

rotating the laser beam about an axis of rotation, substantially parallel to the beam axis, and directing the rotating laser beam toward the workpiece, wherein the angular orientation of the beam cross section changes as the beam is rotated, wherein the axis of rotation is within the beam area.

15. A method according to claim 14, wherein the step of rotating the beam includes the step of reflecting the beam among an odd number of reflective surfaces, wherein the number of reflective surfaces is greater than or equal to three.

16. A method according to claim 14, wherein the step of rotating the beam includes the steps of refracting the beam at a first refractive surface;

reflecting the refracted beam successively from an odd number of reflective surfaces, the number of reflective surfaces being greater than or equal to one; and refracting the beam at a second refractive surface toward the workpiece.

17. A method according to claim 14, wherein the step of rotating the beam includes the steps of:

reflecting the beam from a first surface to a second surface;

reflecting the beam from the second surface to a third surface; and rotating the first, second and third surfaces about the axis of rotation.

18. A method according to claim 17, further including the step of focussing the rotating laser beam after it is reflected from the third surface to apply a focussed rotating laser beam to the workpiece.

19. A method according to claim 17, further including the step of diffracting the rotating laser beam to form multiple rotating laser beams to apply the multiple rotating laser beams to the workpiece.

20. A method according to claim 14, wherein the step of rotating the beam includes the steps of:

refracting the beam at a first surface to a second surface;

reflecting the beam from the second surface to a third surface;

refracting the beam at the third surface to the workpiece; and rotating the first, second and third surfaces about the axis of rotation.

21. A method for drilling holes in a workpiece with a laser comprising the steps of:

receiving a laser beam having a beam cross section with a predetermined angular orientation and directed along a beam axis located within the beam cross section;

rotating the laser beam about an axis of rotation, substantially parallel to the beam axis, and directing the rotating laser beam toward the workpiece, wherein the angular orientation of the beam cross section changes as the beam is rotated, whereby irregularities in the laser beam are applied to the workpiece in a circular pattern.

22. A method according to claim 21, wherein the step of rotating the beam includes the step of reflecting the beam among an odd number of reflective surfaces, wherein the number of reflective surfaces is greater than or equal to three.

23. A method according to claim 21, wherein the step of rotating the beam includes the steps of refracting the beam at a first refractive surface;

reflecting the refracted beam successively from an odd number of reflective surfaces, the number of reflective surfaces being greater than or equal to one; and refracting the beam at a second refractive surface toward the workpiece.

24. A method according to claim 21, wherein the step of rotating the beam includes the steps of:

reflecting the beam from a first surface to a second surface;

reflecting the beam from the second surface to a third surface; and rotating the first, second and third surfaces about the axis of rotation.

25. A method according to claim 24, further including the step of focussing the rotating laser beam after it is reflected from the third surface to apply a focussed rotating laser beam to the workpiece.

26. A method according to claim 24, further including the step of diffracting the rotating laser beam to form multiple rotating laser beams to apply the multiple rotating laser beams to the workpiece.

27. A method according to claim 21, wherein the step of rotating the beam includes the steps of:

refracting the beam at a first surface to a second surface;

reflecting the beam from the second surface to a third surface;

refracting the beam at the third surface to the workpiece; and rotating the first, second and third surfaces about the axis of rotation.

* * * * *